United States Patent [19]

Harris et al.

[11] Patent Number: 5,918,218

[45] Date of Patent: *Jun. 29, 1999

[54] METHOD AND APPARATUS FOR AUTOMATED TRADE TRANSACTIONS PROCESSING

[75] Inventors: Randall C. Harris, Great Falls, Va.; David J. Altobelli, Melrose, Mass.; Robert W. Blucke, Rindge, N.H.; R.J. Montgomery Wilson, Jr., Reading, Mass.; Stephen C. Wyle, Enfield, N.H.

[73] Assignee: First Data Investor Services Group, Inc., Boston, Mass.

[*] Notice: This patent is subject to a terminal disclaimer.

[21] Appl. No.: 08/299,377

[22] Filed: Sep. 1, 1994

[51] Int. Cl.[6] .................................................. G06F 19/00
[52] U.S. Cl. ............................................. 705/37; 705/35
[58] Field of Search ................................... 395/235–238; 705/30, 35–39

[56] References Cited

U.S. PATENT DOCUMENTS

| | | |
|---|---|---|
| 3,703,706 | 11/1972 | Ogura et al. . |
| 4,674,044 | 6/1987 | Kalmus et al. . |
| 5,051,900 | 9/1991 | Ito et al. . |
| 5,101,353 | 3/1992 | Lupien et al. ............................ 395/237 |
| 5,126,936 | 6/1992 | Champion ................................ 395/236 |
| 5,178,417 | 1/1993 | Eshoo . |
| 5,227,967 | 7/1993 | Bailey ..................................... 395/235 |
| 5,233,514 | 8/1993 | Ayyoubi et al. . |
| 5,262,942 | 11/1993 | Earle . |

OTHER PUBLICATIONS

"Expediter, Your new, direct, fully integrated link between systems and funds.," Sungard, four pages, 1993.
"The Shareholder Services Group Acquires Actuarial Computer Technology, Inc.," Press Release by The Shareholder Services Group, Mar. 11, 1993, two pages.
"ACTI Launches New 401(k) Service And Mutual Fund Distribution Network," Press Release by ACTI, a business unit of The Shareholder Services Group, May 26, 1993, two pages.
"DCXchange™ A Revolution In Service", by The Shareholder Services Group, one page.
"A Service That Will Change The World As You Know It," by ACTI, a business unit of the Shareholder Services Group, four pages.
"DCXchange™" by ACTI and The Shareholder Services Group, twelve pages.
"The questions to ask before investing in benefit systems technology," *Pension World 1994 Software Direction; Buyers Guide*, Kent Nowell, p. PWS12, Mar., 1994.

(List continued on next page.)

Primary Examiner—Richard Lee
Attorney, Agent, or Firm—Sidley & Austin

[57] ABSTRACT

An automated trade processing system comprising at least one record keeping system which receives participant mutual fund transactions. The record keeping system aggregates the participant mutual fund transactions into omnibus plan trades which it transmits to a host processor. The host processor also receives pricing and other trade information from at least one transfer agent system. Based on the pricing and other trade information, the host processor evaluates the omnibus plan trades and produces a trade-acknowledgment confirmation file which it transmits along with omnibus plan account information to the at least one record keeping systems. The host processor then transmits the omnibus plan trades to the proper transfer agent. The transfer agent executes the omnibus plan trades and trade-execution confirms them to the host processor. The host processor compares the trade-acknowledgement confirmation and the trade-execution confirmation and generates a mismatch file which is then transmitted to the at least one record keeping systems. This cycle occurs in less than a day and enables the record keeping system to perform daily valuation of all participant accounts in its various plans.

13 Claims, 20 Drawing Sheets

OTHER PUBLICATIONS

"Transfer–related revenue," Letters To The Editor, *Pensions & Investments*, Barbara Baumngarten, Shareholder Services Group, p. 15, Nov. 15, 1993.

"Record–keeping tool launched," *Pensions & Investments*, Chritine Philip, p. 8, Jul. 26, 1993.

"First Data Unit Launches Mutual Fund Network," *BC cycle, Reuters, Limited*, Financial Report, May 26, 1993.

"Preferred List Strategy: Business Specifications," The Shareholder Services Group and American Express Information Services, pp. 1–66 and Appendices A–C, Jul., 1990.

Record Type 01.1 (Subscriptions and redemptions) (First record of three)

| Field Descriptions | Start | Length | Formats/Constants | Requirements, Formats and Comments |
|---|---|---|---|---|
| System Code | 1 | 1 | 'B' | Required constant |
| Type of record | 2 | 2 | '01' | Required constant |
| Sequence number of record | 4 | 2 | '1' | Required constant, the format is one and one space |
| Clearing broker number | 6 | 4 | '0000' | Zeros filled |
| Cusip number | 10 | 9 | Alpha | Required, Valid cusip number for fund/product<br>DEFN: The fund cusip number |
| Executing broker number | 19 | 4 | '0000' | Zeros filled |
| Branch number | 23 | 9 | Numeric | Required, greater than zeros<br>DEFN: the branch number the broker is assigned to within their firm. |
| Account rep number | 32 | 9 | Numeric | Required, greater than zeros<br>DEFN: The representative number of the broker assigned by their firm. |
| Rep name | 41 | 15 | All ' ' | Spaces |
| Transaction type | 56 | 1 | Alpha | Required, Valid only '1' = LOI purchase<br>'2' = ROA purchase<br>'3' = NAV trade<br>DEFN: A purchase is = LOI, ROA or NAV trade (redemptions are NAV). |
| Transaction code | 57 | 2 | Alpha | Required, Valid only '02' = Purchase<br>'03' = Redemption<br>DEFN: Subsequent purchases and partial rads must be identified. |
| Date of trade (price date) | 59 | 6 | MMDDYY | Required, must be today's date |
| Ira indicator | 65 | 1 | ' ' | Spaces |
| Fract indicator | 66 | 1 | ' ' | Spaces |
| Book share indicator | 67 | 1 | '1' | Required constant<br>DEFN: Identifies the location of settlement |
| PI delivery indicator | 68 | 1 | All ' ' | Spaces |
| Confirm number | 69 | 12 | All ' ' | Spaces |
| Control number | 81 | 11 | Numeric | Zeroes |
| Contractual settlement date | 92 | 6 | MMDDYY | Required, Equal to today's date for same day settle |
| Transaction identification number | 98 | 20 | ALPHA | Required, Control number assigned by source of trade<br>DEFN: See business requirements for format and assignment |
| Spaces | 118 | 3 | All ' ' | Spaces |

FIG. 3

Record Type 01.2 (Subscriptions and redemptions)

| Field Descriptions | Start | Length | (Second record of three) Formats/Constants | Requirements, Formats and Comments |
|---|---|---|---|---|
| System Code | 1 | 1 | 'B' | Required constant |
| Type of record | 2 | 2 | '01' | Required constant |
| Sequence number of record | 4 | 2 | '2' | Required constant, the format is two and one space |
| Clearing broker number | 6 | 4 | '0000' | Zeros filled |
| Broker client number | 10 | 20 | Alpha | Required, Plan account number assign by source DEFN: See business requirements for format and assignment |
| Foreign/domestic indicator | 30 | 1 | '0' | Required, Constant '0' = Domestic |
| Fund account number | 31 | 20 | Alpha | Required, DEFN: The account number assigned by the T/A system list will be provided by TSSG |
| State of sale | 51 | 2 | Alpha | Required, DEFN: The state that the plan is registered in. |
| Dollar amount of trade | 53 | 11 | Numeric | Required either. Must be in 9(8)V99 format |
| Shares of trade | 64 | 12 | Numeric | or, Must be in 9(9)V999 format, last digit must be zero For purchases, dollars only must be filled. For redemptions, either dollars or shares, but not both, must be filled. |
| Sale rate | 76 | 4 | '0000' | Zeros filled |
| liq. indicator | 80 | 1 | | Spaces |
| Fund code | 81 | 3 | '000' | Zeros filled |
| Payment type | 84 | 1 | '1' | Required, '1' = Immediate money for same day settle DEFN: Payment type is used to define processing for order clearance or cash. All 401(k) is wire order/same day settlement and will therefore always be '1' |
| Executing dealer number | 85 | 6 | Alpha | Required, greater than zeros DEFN: originating dealer number, may be same as clearing broker number |
| Clearing dealer number | 91 | 6 | Alpha | Required, greater than zeros DEFN: The TA assigned clearing broker dealer number |
| Spaces | 97 | 24 | All ' ' | Spaces |

FIG. 4

Record Type 01.3 (Subscriptions and redemptions) (Third record of three)

| Field Descriptions | Start | Length | Formats/Constants | Requirements, Formats and Comments |
|---|---|---|---|---|
| System Code | 1 | 1 | 'B' | Required constant |
| Type of record | 2 | 2 | '01' | Required constant |
| Sequence number of record | 4 | 2 | '3' | Required constant, the format is three and one space |
| Clearing broker number | 6 | 4 | '0000' | Zeros filled |
| cust name | 10 | 20 | All ' ' | Spaces |
| ROA or LOI amount | 30 | 11 | Numeric | Required if used. In 9(9)V99 format used for level DEFN: The dollar amount of the breakpoint for rights of accumulation may also be the dollar value of the account. |
| LOI date | 41 | 6 | '000000' | Zeros filled |
| Rel trade indicator | 47 | 1 | All ' ' | Spaces |
| Rel account number | 48 | 20 | All ' ' | Spaces |
| Country for Foreign accounts | 68 | 2 | | Spaces |
| NRA tax | 70 | 2 | '00' | Zeros filled |
| Memo | 72 | 9 | Alpha | Spaces filled |
| Gross proceed | 81 | 2 | '00' | Zeros filled |
| Div int with | 83 | 2 | '00' | Zeros filled |
| Spaces | 85 | 36 | All ' ' | Spaces |

FIG. 5

Record Type 15.1 (Exchanges) (First record of three)

| Field Descriptions | Start | Length | Formats/Constants | Requirements, Formats and Comments |
|---|---|---|---|---|
| System Code | 1 | 1 | 'B' | Required constant |
| Type of record | 2 | 2 | '15' | Required constant |
| Sequence number of record | 4 | 2 | '1' | Required constant, the format is one and one space |
| Clearing broker number | 6 | 4 | '0000' | Zeros filled |
| Exchange from cusip number | 10 | 9 | Alpha | Required, Valid from cusip for fund<br>DEFN: The fund cusip number |
| Executing broker number | 19 | 4 | ' ' | Spaces |
| Branch number | 23 | 9 | Numeric | Required, greater than zeros<br>DEFN: The branch number the broker is assigned to within their firm |
| Account rep number | 32 | 9 | Numeric | Required, greater than zeros<br>DEFN: The representative number of the broker assigned by their firm |
| Account rep name | 41 | 15 | All ' ' | Spaces |
| Exchange transaction type | 56 | 1 | '6' | Required constant |
| Exchange transaction code | 57 | 2 | '06' | Required constant '06' = Partial exchange |
| Date of exchange | 59 | 6 | MMDDYY | Required, Today's date |
| New reg indicator | 65 | 1 | ' ' | Spaces |
| Exchange fraction indicator | 66 | 1 | '1' | Required constant '1' = Issue fractional (Required)<br>DEFN: Allows a fractional share exchange to occur. |
| Book share indicator | 67 | 1 | ' ' | Required constant<br>DEFN: Identifies the location of settlement |
| PI delivery indicator | 68 | 1 | ' ' | Spaces |
| Exchange to cusip number | 69 | 9 | Alpha | Required, Valid to cusip for fund<br>DEFN: The fund cusip number |
| Spaces | 78 | 2 | ' ' | Spaces |
| From-To indicator | 80 | 1 | ' ' | Spaces |
| Control Number | 81 | 11 | ' ' | Spaces |
| As of date | 92 | 6 | '000000' | Zeros |
| As of reason | 98 | 3 | ' ' | Spaces |
| Transaction identification number | 101 | 20 | ALPHA | Required, Control number assigned by source of trade<br>DEFN: See business requirements for format and assignment |

FIG. 6

Record Type 15.2 (Exchanges) (Second record of three)

| Field Descriptions | Start | Length | Formats/Constants | Requirements, Formats and Comments |
|---|---|---|---|---|
| System Code | 1 | 1 | 'B' | Required constant |
| Type of record | 2 | 2 | '15' | Required constant |
| Sequence number of record | 4 | 2 | '2' | Required constant, the format is two and one space |
| Clearing broker number | 6 | 4 | '0000' | Zeros filled |
| From fund account number | 10 | 20 | Alpha | Required<br>DEFN: The account number assigned by the T/A system |
| To fund account number | 30 | 20 | Alpha | Required<br>DEFN: The account number assigned by the T/A system |
| From dollar amount | 50 | 11 | All '0' | Zeros filled |
| From shares | 61 | 12 | Numeric | Required Valid shares, in 9(8)v9999 format, last digit must be zero |
| To sale rate | 73 | 4 | '0000' | Zeros filled |
| From account net indicator | 77 | 1 | '0' | Zeros filled |
| From account indicator | 78 | 1 | '0' | Required constant |
| To account net indicator | 79 | 1 | '0' | Zeros filled |
| To account indicator | 80 | 1 | '0' | Required constant |
| Gross proceed | 81 | 2 | All '0' | Zeros filled |
| Div int with | 83 | 2 | All '0' | Zeros filled |
| From fund | 85 | 3 | All '0' | Zeros filled |
| To fund | 88 | 3 | All '0' | Zeros filled |
| Payment type | 91 | 1 | | Spaces |
| Executing dealer number | 92 | 6 | Alpha | Required, greater than zeros<br>DEFN: Originating dealer number, may be same as clearing broker number |
| Clearing dealer number | 98 | 6 | Alpha | Required, greater than zeros<br>DEFN: The TA assigned clearing broker dealer number |
| To Executing dealer number | 104 | 6 | Alpha | Required, greater than zeros<br>DEFN: The To Account dealer no., may be same as clearing broker number |
| To Clearing dealer number | 110 | 6 | Alpha | Required, greater than zeros<br>DEFN: To TO Account clearing broker dealer number |
| State of sale | 116 | 2 | All ' ' | Required on cross management co exchanges, else spaces |
| Spaces | 118 | 3 | All ' ' | Spaces |

FIG. 7

Record Type 15.3 (Exchanges) (Third record of three)

| Field Descriptions | Start | Length | Formats/Constants | Requirements, Formats and Comments |
|---|---|---|---|---|
| System Code | 1 | 1 | 'B' | Required constant |
| Type of record | 2 | 2 | '15' | Required constant |
| Sequence number of record | 4 | 2 | '3' | Required constant, the format is three and one space |
| Clearing broker number | 6 | 4 | '0000' | Zeros filled |
| Broker client number | 10 | 20 | Alpha | Required, Plan account number assign by source<br>DEFN: See business requirements for format and assignment |
| Cust name | 30 | 20 | All ' ' | Spaces |
| Confirm number | 50 | 12 | All ' ' | Spaces |
| Rel trade | 62 | 1 | All ' ' | Spaces |
| Memo | 63 | 12 | All ' ' | Spaces |
| From sales rate | 75 | 4 | '0000' | Zeros filled |
| 401K Exchange fee indicator | 79 | 1 | | '0' = Not exempt, '1' = Exempt from exchange fee |
| 401K Exchange differential level | 80 | 2 | Alpha | '99' = exchange differential subscription at NAV price<br>Required if used, In 9(9)V99 format used for level |
| 401K Exchange to ROA/LOI amount | 82 | 11 | Numeric | DEFN: The dollar amount of the breakpoint for rights of accumulation may also be the dollar value of the account. (For future use) |
| To Branch number | 93 | 9 | Numeric | Required, greater than zeros<br>DEFN: To branch number the broker is assigned to within their firm |
| To Account rep number | 102 | 9 | Numeric | Required, greater than zeros<br>DEFN: To representative number of the broker assigned by their firm |
| Spaces | 111 | 10 | All ' ' | Spaces |

FIG. 8

Record Type 05.1 (Subscriptions and redemptions Confirms) (First of three records)
Record Type 10.1 (Late/cancel div/cap gain reinvests)
Record Type 20.1 (Cancel subscriptions/redemptions)

| Field Descriptions | Start | Length | Formats/Constants | Requirements, Formats and Comments |
|---|---|---|---|---|
| System Code | 1 | 1 | 'B' | 'B' for source originated transaction |
| Type of Record | 2 | 4 | '05','10','20' | Depending on transaction type |
| Sequence number of record | 4 | 4 | '1' | |
| Broker Number | 5 | 4 | Alpha | Zeros |
| Control Number | 9 | 11 | Numeric | Zeros |
| Correct Ind | 20 | 1 | Alpha | Space |
| Cusip number | 21 | 9 | Alpha | |
| Exe Broker | 30 | 4 | Alpha | Zeros |
| Branch number | 34 | 9 | Numeric | |
| Transaction type | 43 | 1 | Alpha | Same as input requirements |
| Transaction code | 44 | 2 | Alpha | Same as input requirements |
| Trade date | 46 | 6 | Numeric | MMDDYY |
| As-of date | 52 | 6 | Numeric | Zeros |
| IRA indicator | 58 | 1 | Alpha | Spaces |
| Fract indicator | 59 | 1 | Alpha | Spaces |
| Book share indicator | 60 | 1 | Alpha | Space |
| PI Delivery | 61 | 1 | Alpha | Spaces |
| Confirm number | 62 | 12 | Alpha | Spaces |
| Broker client number | 74 | 20 | Alpha | |
| Foreign/domestic indicator | 94 | 1 | Alpha | '0' |
| Fund account number | 95 | 20 | Alpha | |
| Contractual settlement date | 115 | 6 | MMDDYY | For same day settle, this date will be same as trade date |
| T/A trans code | 121 | 3 | Alpha | Transaction code from acceptance record |
| Filler | 124 | 7 | Alpha | Spaces |
| Reject code | 131 | 2 | Alpha | TSSG will provide list of reject codes |
| Gross Proceeds | 133 | 2 | Numeric | In v99 Format Zeros |
| Div INT with | 135 | 2 | Numeric | In v99 Format Zeros |
| CDSC indicator | 137 | 1 | Alpha | Spaces |
| Principal or share indicator | 138 | 1 | Alpha | 'P' = Principal, 'S' = Share |
| Fund code | 139 | 3 | Numeric | Zeroes |
| Executing dealer number | 142 | 6 | Alpha | |
| Filler | 148 | 2 | Alpha | Spaces |
| Reject code listing indicator | 150 | 1 | Alpha | 'F' = Fund/Serv, 'N' = Network, 'R' = TSSG, 'P' = dcx |

FIG. 9

Record Type 05.2 (Subscriptions and redemptions Confirms) (Second of three records)
Record Type 10.2 (Late/cancel div/cap gain reinvests)
Record Type 20.2 (Cancel redemptions)

| Field Descriptions | Start | Length | Formats/Constants | Requirements, Formats and Comments |
|---|---|---|---|---|
| System Code | 1 | 1 | 'B' | 'B' for source originated transaction |
| Type of record | 2 | 2 | '05', '10', '20' | |
| Sequence number of record | 4 | 1 | '2' | |
| Broker Number | 5 | 4 | Alpha | |
| Control Number | 9 | 11 | Numeric | Zeros |
| Correct Ind | 20 | 1 | Alpha | Zeros |
| Account rep number | 21 | 9 | Numeric | Space |
| Account rep name | 30 | 15 | Alpha | |
| State of sale | 45 | 2 | Alpha | Spaces |
| Dollar amount | 47 | 11 | Numeric | In 9(9)V99 format |

FIG. 10

Record Type 05,3 (Subscriptions and redemptions Confirms) (Third of three records)
Record Type 10,3 (Late/cancel div/cap gain reinvests)
Record Type 20,3 (Cancel redemptions)

| Field Descriptions | Start | Length | Formats/Constants | Requirements, Formats and Comments |
|---|---|---|---|---|
| System Code | 1 | 1 | 'B' | 'B' for source originated transaction |
| Type of record | 2 | 2 | '05','10','20' | |
| Sequence number of record | 4 | 1 | '3' | |
| Broker Number | 5 | 4 | Alpha | Zeros |
| Control Number | 9 | 11 | Numeric | Zeros |
| Correct Ind | 20 | 1 | Alpha | Space |
| ROA or LOI amount | 21 | 11 | Numeric | In 9(9)v99 format |
| LOI date | 32 | 6 | '000000' | In 9(06) format |
| Customer name | 38 | 20 | Alpha | Spaces |
| Rel Trade | 58 | 1 | Alpha | Spaces |
| Rel Account Number | 59 | 20 | Alpha | Spaces |
| Country for foreign accounts | 79 | 2 | Alpha | Spaces |
| NRA Tax | 81 | 2 | Numeric | In V99 format Zeroes |
| MEMO | 83 | 9 | Alpha | Spaces |
| Withholding amount | 92 | 11 | Numeric | In 9(09) v99 format Zeroes |
| Trans Id | 103 | 20 | Alpha | Spaces |
| Filler | 123 | 28 | Alpha | Spaces |

FIG. 11

Record Type 16.1 (Exchange Confirms) (First of four records)

| Field Descriptions | Start | Length | Formats/Constants | Requirements, Formats and Comments |
|---|---|---|---|---|
| System Code | 1 | 1 | 'B' | 'B' for source originated transaction |
| Type of record | 2 | 2 | '16' | |
| Sequence number of record | 4 | 1 | '1' | |
| Zeros | 5 | 4 | All '0' | Zeros |
| Zeros | 9 | 11 | All '0' | Zeros |
| Spaces | 20 | 1 | Space | Space |
| From cusip number | 21 | 9 | Alpha | |
| Zeros | 30 | 4 | All '0' | |
| Branch number | 34 | 9 | Numeric | |
| Spaces | 43 | 2 | | Space |
| Exchange transaction code | 45 | 2 | '06' | '06' = partial exchange |
| Date of exchange | 46 | 6 | MMDDYY | |
| Spaces | 52 | 7 | | Spaces |
| Exchange fraction indicator | 59 | 1 | '1' | '1' = Issue fraction |
| Share indictor | 60 | 1 | '0' | Constant |
| Spaces | 61 | 13 | | Spaces |
| To cusip number | 74 | 9 | Alpha | |
| Spaces | 83 | 12 | | Spaces |
| To fund account number | 95 | 20 | Alpha | |
| Settlement date | 115 | 6 | MMDDYY | Same as the date of exchange |
| Spaces | 121 | 1 | | Space |
| From account indicator | 122 | 1 | | Space |
| Spaces | 123 | 1 | | |
| To account indicator | 124 | 1 | '0' | |
| Exchange withhold indicator | 125 | 1 | '0' | '0' = no withhold |
| Spaces | 126 | 2 | All ' ' | Spaces |
| T/A trans code | 128 | 3 | Alpha | Transaction code from acceptance record |
| Reject code | 131 | 2 | Alpha | TSSG will provide list of reject codes |
| As-of date | 133 | 6 | '000000' | Zeros |
| As-of reason code | 139 | 3 | '000' | Zeros |
| From fund number | 142 | 3 | '000' | Zeros |
| To fund number | 145 | 3 | '000' | Zeros |
| Spaces | 148 | 2 | All ' ' | Spaces |
| Reject code listing indicator | 150 | 1 | Alpha | 'F' = Fund/Serv, 'N' = Network, 'R' = TSSG, 'P' = DCX |

FIG. 12

Record Type 16.2 (Exchange Confirms) (Second of four records)

| Field Descriptions | Start | Length | Formats/Constants | Requirements, Formats and Comments |
|---|---|---|---|---|
| System Code | 1 | 1 | 'B' | 'B' for source originated transaction |
| Type of record | 2 | 2 | '16' | |
| Sequence number of record | 4 | 1 | '2' | |
| Broker Number | 5 | 4 | All '0' | Zeros |
| Control Number | 9 | 11 | All '0' | Zeros |
| Filler | 20 | 1 | Alpha | Space |
| Account rep number | 21 | 9 | Numeric | |
| Account re name | 30 | 15 | Alpha | |
| From fund account number | 45 | 20 | Alpha | Spaces |
| Exchange from dollar amount | 65 | 11 | Numeric | In 9(9)V99 format |
| Exchange from amount due | 76 | 11 | Numeric | In 9(9)V99 format |
| Exchange from shares | 87 | 12 | Numeric | In 9(8)V9999 format |
| Exchange from price per share | 99 | 6 | Numeric | In 999V999 format |
| Exchange fee | 105 | 4 | Numeric | In 99V99 format |
| From sales charge rate | 109 | 4 | Numeric | In 9V999 format |
| Broker client number | 113 | 20 | Alpha | Spaces |
| Gross proceed | 133 | 2 | Numeric | In V99 format Zeroes |
| Div int with | 135 | 2 | Numeric | In V99 format Zeroes |
| Exchange withhold amount | 137 | 11 | Numeric | In 9(9)V99 format |
| Filler | 148 | 3 | Alpha | Spaces |

FIG. 13

Record Type 16.3 (Exchange Confirms) (Third of four records)

| Field Descriptions | Start | Length | Formats/Constants | Requirements, Formats and Comments |
|---|---|---|---|---|
| System Code | 1 | 1 | 'B' | 'B' for source originated transaction |
| Type of record | 2 | 2 | '16' | |
| Sequence number of record | 4 | 1 | '3' | |
| Broker Number | 5 | 4 | Alpha | |
| Control Number | 9 | 11 | Alpha | |
| Filler | 20 | 1 | Alpha | Zeros |
| To dollar amount | 21 | 11 | Numeric | Zeros |
| To amount due | 32 | 11 | Numeric | Space |
| To total shares | 43 | 12 | Numeric | In 9(9)V99 format |
| To price per shares | 55 | 6 | Numeric | In 9(9)V99 format |
| To sales charge rate | 61 | 4 | Numeric | In 9(8)V9999 format |
| To dealer commission | 65 | 8 | Numeric | In 999V999 format |
| From sales charge amount | 73 | 8 | Numeric | In 9V999 format |
| To total amount due | 81 | 11 | Numeric | In 9(6)V99 format |
|  |  |  |  | In 9(9)V99 format |
| DCX control number | 92 | 20 | Alpha | 401(K) source control number |
| DCX Executing dealer number | 112 | 6 | Alpha | |
| DCX Clearing dealer number | 118 | 6 | Alpha | |
| Filler | 124 | 27 | Alpha | Spaces |

FIG. 14

Record Type 16.4 (Exchange Confirms) (Fourth of four records)

| Field Descriptions | Start | Length | Formats/Constants | Requirements, Formats and Comments |
|---|---|---|---|---|
| System Code | 1 | 1 | 'B' | 'B' for source originated transaction |
| Type of record | 2 | 2 | '16' | |
| Sequence number of record | 4 | 1 | '4' | |
| Broker Number | 5 | 4 | Numeric | Zeros |
| Control Number | 9 | 11 | Alpha | Zeros |
| Filler | 20 | 1 | Alpha | Space |
| To dollar amount | 21 | 11 | Numeric | In 9(09)v99 format Zeroes |
| To amount due | 32 | 11 | Numeric | In 9(09)v99 format Zeroes |
| To total shr | 43 | 12 | Numeric | In 9(09)v999 format Zeroes |
| To price shr | 55 | 6 | Numeric | In 9(03)v999 format Zeroes |
| To sale rate | 61 | 4 | Numeric | In 9v999 format Zeroes |
| To dealer commission | 65 | 8 | Numeric | In 9(06)v99 format Zeroes |
| Trans ID | 73 | 20 | Numeric | In 9(06)v99 format Zeroes |
| Filler | 93 | 58 | Alpha | Spaces |

FIG. 15

METHOD AND APPARATUS FOR AUTOMATED TRADE TRANSACTIONS PROCESSING

RELATED INVENTIONS

This application is related U.S. Pat. No. 5,517,406 entitled "Method and Apparatus For Data Verification and Position Reporting In An Automated Trade Processing System".

MICROFICHE APPENDIX AND COPYRIGHT NOTIFICATION

This application contains 3 sheets and 266 pages of a Microfiche Appendix. A portion of the disclosure of this patent document contains material which is subject to copyright protection. The copyright owner has no objection to the facsimile production by any one of the patent disclosure, as it appears in the Patent and Trademark Office patent files or records, but otherwise reserves all copyright rights whatsoever.

FIELD OF THE INVENTION

The present invention relates to an automated trade processing system and more particularly to an automated trade processing system which interfaces customer trade transactions from a record keeping system to a transfer agent which executes the customer trade transactions.

BACKGROUND OF THE INVENTION

In recent times, both employees and employers have become cognizant of the tax implications of payroll amounts and the significant impact such taxes can have on an employee's take-home pay. One particular vehicle for reducing tax burden provided for under the tax laws is the 401(k) plan. Such plans, which are offered by almost all major employers and by an increasing number of small employers, are designed to encourage retirement savings in return for deferred taxation on the income channelled into the plan. Often, employers will further match or add some percentage of the employee's contribution to the deferred compensation plan.

The monies contributed to the plan are invested in one or more investment alternatives offered by the particular plan. One prominent investment alternative associated with 401 (k) plans is mutual funds. Often, 401(k) plans offer investment opportunities including a particular mutual fund family with each of the particular mutual funds representing a particular investment directive. Participants are typically provided with the ability to exchange shares of one mutual fund with another. In view of the purpose for 401(k) plans (encouraging retirement savings), withdrawals (fund redemptions) prior to retirement age are severely limited and often carry an associated tax penalty.

In a typical scenario, 401(k) participants purchase and redeem shares in mutual funds through the transfer of payroll assets to a transfer agent (for a purchase) or through the transfer of fund assets to the participant (for a redemption). The transfer agent acts on behalf of the mutual fund or family of mutual funds in order to execute all transactions (including purchases, redemptions and exchanges between funds) relating to one or more funds. All such transactions are subject to various tax reporting requirements and legal and accounting restrictions.

The tax laws applicable to 401(k) plans are, at best, complex. Such constraints as maximum contributions per employee, detailed IRS reporting requirements and significant administrative responsibilities may be problematical for employers both large and small. Due to this complexity, many employers enlist the services of a record keeper. The Department of Labor's interpretation of rule 404(c) indicates that a provider can limit their fiduciary liability if a wide variety of investment options are available within the 401(k) plan it provides and if they increase the frequency by which participants in the 401(k) plan can change their elections. This interpretation has encouraged many employers to increase the selection of investment options available within its 401(k) plan. As more and more plan sponsors enhance their plan and offer more investment options, the need for accurate record keepers to assist in the growing task of overseeing these plans increases.

Valuation of investments in retirement plans, such as a 401(k) plan, was traditionally performed using a technique called balance forward. In such a system, changes to investment options in the plan would only become effective at the end of a balancing period, for example, quarterly. The balance of the account throughout the quarter thus was brought forward to the end of the quarter for valuating the participant's account. Participants in these plans, however, began to demand daily valuation, whereby investment options could be altered on a daily basis and whereby balances for the participant's account would be updated daily. Performing daily valuation requires that the record keeper of the 401(k) plan report the market value for each participant's account on a daily basis. Any errors on the part of the record keeper may make the record keeper "financially" liable to the participant.

Unfortunately for plan participants, plan sponsors, and record keepers, there has heretofore been no ability to perform the required transactions in a timely, accurate and efficient manner and without a significant amount of human intervention which is required to meet the objective of providing daily valuation. In most cases, it is currently necessary to acquire or develop an accounting system and specialized staff working throughout the day and the night to process plan adjustments and transactions to complete valuation on a daily basis. This is a necessity because plan sponsors as well as plan participants demand timely access to current positions and recent transactions associated with the plan accounts. As a result, significant labor and equipment charges are incurred to provide the required daily accounting cycle. In addition, reconciliation of accounts is often difficult to achieve and inaccuracies are often introduced.

SUMMARY OF THE INVENTION

It is therefore an object of the present invention to provide record keepers, plan sponsors, and plan participants, with reliable and efficient access to record keeping data regarding mutual fund accounts.

It is a further object of the present invention to provide this access automatically and with a minimum of human intervention.

It is a yet further object of the present invention to provide position information, trade execution and trade verification accurately and on a daily basis.

The foregoing objects are accomplished in a system providing a seamless electronic interface that links participant accounts, employer plans, a daily record keeping system, and mutual fund transfer agents. In this system, raw trades are received by a host processor from a record keeper and price files are received from a transfer agent. Upon receipt of all trade data and the necessary pricing information, the host processor prices and extends the trades and trade-acknowledgment confirms them back to the record keeper. Extended trades are next sorted and formatted according to the particular format required by the appropriate transfer agent. Once formatted, trades are transmitted to the transfer agents, the transfer agent executes the trades and then trade-execution confirms them back to the host processor. Upon receipt of trade-execution confirmation from the transfer agent, the trade execution confirmation data is compared with the trade-acknowledgment confirmation data previously reported to the record keeper. In the event of discrepancies, a mismatch file is generated which may be used by the record keeper to update and correct specific accounts.

One particular advantage of the invention herein is the ability to provide trade-acknowledgment confirmation back to the record keeper prior to actually receiving trade-execution confirmation from the transfer agent. Normally, after sending the plan trades to the tranfer agent, the record keeper would have to wait for the tranfer agent to execute a nightly update before receiving back trade-execution confirmation. This would not allow the record keepers to update their record keeping systems in time to provide daily valued information to plan participants and sponsors the next morning. Additionally, with the trade-acknowledgment confirmation, price and accrual information from the transfer agents is passed to the record keeper. Therefore, the record keeper can begin the process of daily valuation of participant accounts even prior to the actual execution of the requested trades.

Further, plan account balances maintained at the transfer agents are also transmitted to the record keeper. The balance files contain information regarding the position of the plan. The record keeper may then aggregate all of its participant account for the particular fund to determine its aggregate balance for the plan. The record keeper then may reconcile its aggregate "plan" balance with the "plan" balance maintained by the transfer agent. In the method of this invention, valuation and position information can then be current and accessible to plan participants and/or the record keeper on a daily basis. In the event of an unexecuted trade, a mismatch file reporting the discrepancies is transmitted to the record keeper for reconciliation on a daily basis.

BRIEF DESCRIPTION OF THE DRAWINGS

The present invention will be apparent from the following detailed description taken in conjunction with the accompanying drawings in which:

FIG. 3 is a listing of a data record for the first of three records for purchases and redemptions;

FIG. 4 is a listing of a data record for the second of three records for purchases and redemptions;

FIG. 5 is a listing of a data record for the third of three records for purchases and redemptions;

FIG. 6 is a listing of a data record for the first of three exchange records;

FIG. 7 is a listing of a data record for the second of three exchange records;

FIG. 8 is a listing of a data record for the third of three exchange records;

FIG. 9 is a listing of a data record for the first of three confirmation records for purchases and redemptions;

FIG. 10 is a listing of a data record for the second of three confirmation records for purchases and redemptions;

FIG. 11 is a listing of a data record for the third of three confirmation records for purchases and redemptions;

FIG. 12 is a listing of a data record for the first of four exchange confirmation records;

FIG. 13 is a listing of a data record for the second of four exchange confirmation records;

FIG. 14 is a listing of a data record for the third of four exchange confirmation records;

FIG. 15 is a listing of a data record for the third of four exchange confirmation records;

DETAILED DESCRIPTION OF THE PREFERRED EMBODIMENTS

Figure 1:
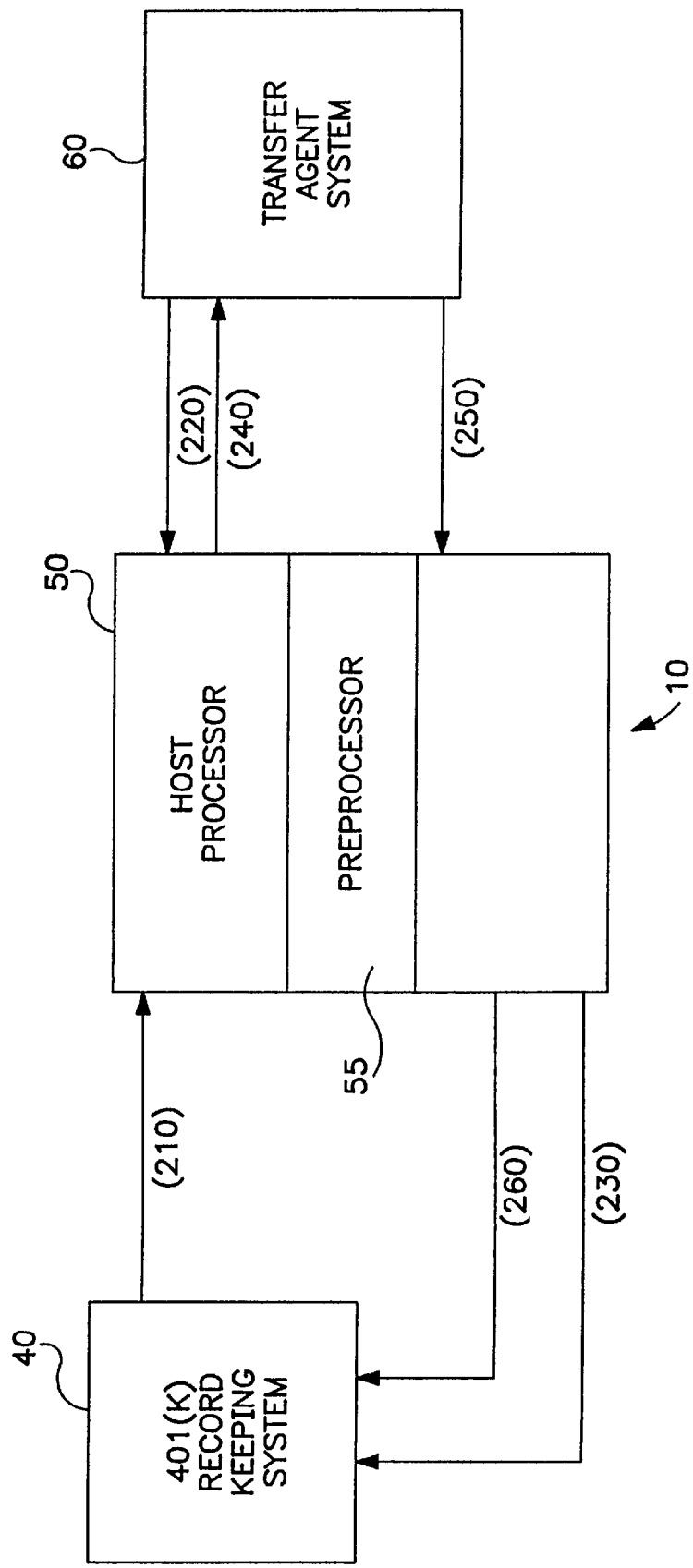
FIG. 1 is a block diagram depicting one embodiment of the present invention.

FIG. 1 is a block diagram illustrating an automated trade processing system according to one preferred embodiment. In addition, FIG. 1 shows, in a broad sense, the flow of data occurring within the system during a typical daily cycle. A high level discussion of the system of the current invention is now described in connection with FIG. 1.

For the purposes of explanation, a brief overview of terminology is useful.

A plan is an organization which invests in mutual funds. The plan has a plurality of participants. The plan performs the trades on behalf of its participants and owes a fiduciary obligation to its participants. One example is a 401(k) retirement plan. Other plans may include insurance companies, mutual fund companies, banks, and trustees.

A record keeper is an organization which performs record keeping and accounting services for a plan and assumes many of the legal responsibilities to the participants in the plan. The record keeper is responsible for accepting trades and forwarding those trades to various mutual fund transfer agents.

A mutual fund transfer agent is an organization which is responsible for pricing and executing mutual fund trades, maintaining and reporting on investor account balances and computing and crediting earnings in the fund. Typically one transfer agent oversees a plurality of various mutual funds.

A dealer is a NASD licensed broker/dealer firm having a plurality of representatives who are licensed to sell securities including mutual funds.

A family of funds is a collection of mutual funds which are managed by the same mutual fund management company.

A public offering price (POP) is the price at which a mutual fund may be purchased by the general public.

A net asset value (NAV) is the actual value of the shares of the mutual fund based on the day's closing market value of the underlying securities. NAV may differ from POP due to commissions due dealers and/or their representatives.

Front-end load commissions are commissions that are assessed at the time of purchase of shares of a mutual fund.

Back-end load commissions are commissions that are assessed at the time of redemption of shares of a mutual fund.

Rights of Accumulation (ROA) is a scheme by which discounts in commission levels is determined. For a particular buyer, the more assets that the buyer has in a particular front-end load fund, the lower the commission on the purchase of additional shares in that front-end load fund. Discounts may range from 0.25% to the full load on the purchase. If the discount is equal to the full load, then the POP is equal to the NAV.

A Letter of Intent (LOI) is a contract between the plan and a fund in which the plan agrees to purchase a specified dollar amount over a thirteen month period. The contract allows for the plan to receive a discount on all the purchases made over the time period. For example, in a typical 5% front-end load fund, a LOI with a valuation of $1M would allow the plan a discount amount of 3% on all purchases until the LOI is fulfilled.

A redemption is a sale of a share or shares in a mutual fund. Alternatively, the current tax laws provide a mechanism whereby the participant may take a "loan" against his or her account. In this scenario, the participant specifies the amount of the "loan" requested. Subsequently, the number of shares in that participant's account necessary to provide the requested funds are sold. Normally, however, the value of the loan remains in the participant's account and must be paid back by the participant over a certain period of time.

A subscription is a purchase of a share or shares, specified usually in dollar amounts, in a mutual fund.

An exchange is a move between ownership of one type of "fund" for ownership of another type of "fund". A standard exchange is one in which the two mutual funds which are being exchanged belong to the same family of funds. A cross-management company exchange is one in which the two mutual funds belong to different mutual fund families.

The present invention employs two types of confirmations.

A trade-acknowledgment confirmation is a notification from the host processor to the record keeping system as to whether the trade has been received, verified, priced, and extended. At this point, if a positive trade-acknowledgment confirmation is received, all liability to the participant with respect to execution of the trade is removed from the record keeping system.

A trade-execution confirmation is a notification from the transfer agent to the host processor as to whether the trade has been received, verified, priced, and extended.

For purposes of illustration, in the following discussion, one particular application of the present invention is described. It will be appreciated from the following that the invention is not limited to a 401(k) record keeping environment. Other plans such as those described above, may also be utilized.

Automated trade processing system 10 includes 401(k) record keeping system 40, host processor 50, and transfer agent system 60. These three primary components of the system are able to communicate with one another in a variety of ways known in the art. Although only one 401(k) record keeping system is illustrated in FIG. 1, in a typical implementation, multiple 401(k) record keeping systems 40 (each corresponding to one or more plans) may interface with host processor 50 to form the processing network. Similarly, multiple transfer agent systems 60 (each corresponding to a transfer agent responsible for one or more securities or mutual funds) typically interface with host processor 50 to form the network. In one preferred embodiment, 401(k) record keeping system 40 communicates only with host processor 50 and does so through a dedicated line. Transfer agent system 60 communicates only with host processor 50 and also does so through a dedicated line. Alternatively, the communication channels to and from host processor 50 may be accomplished via modem, local area network (LAN), wide area network (WAN) or any other device for transmitting electronic data in a timely fashion.

It will be understood by one of ordinary skill in the art that although communication has been described above as limited to that with host processor 50, 401(k) record keeping system 40 and transfer agent system 60 may interface with a variety of external information sources and information recipients. For example, 401(k) record keeping system 40 may provide individual account information directly to employees either directly or through a customer service interface. Further, transfer agent system 60 may communicate with one or more external systems associated with each particular mutual fund for which the transfer agent acts.

401(k) record keeping system 40 performs trade entry, record keeping, reporting, and IRS compliance functions. In one preferred embodiment, the 401(k) record keeping system 40 is ACT II™, a product available from Actuarial Computer Technology Inc. (ACTI), a subsidiary of the assignee of this invention. 401(k) record keeping system 40 receives transactions from the 401(k) plan, payroll services, or directly from the participant. Information originating from payroll services is likely to be in the form of a payroll deduction for each participant to be allocated to the plan. Upon receipt of this information, 401(k) record keeping system 40 processes the transactions specified against participant level records, verifying that the transactions are within legal and IRS compliance, both at plan and at participant level. Approved transactions are then aggregated by plan, fund, and trade type in omnibus plan trade files and transmitted to host processor 50.

Host processor 50 functions as the central point of the automated trade processing cycle. Host processor 50 receives and edits the omnibus plan trade files for integrity and data errors as well as data verification regarding permitted transactions. Host processor 50 then receives pricing and accrual rate information from each transfer agent system 60. Using this price information, the trade records are priced, extended, and trade-acknowledge confirmed to 401(k) record keeping system 40. Further, copies of the price files and accrual rate files received from transfer agents systems 60 are transmitted to 401(k) record keeping system 40 along with the trade-acknowledge confirmation. After receipt of the price and accrual rate files, 401(k) record keeping system 40 begins daily valuation of its participant accounts. The extended trades are sorted, formatted, and passed to the appropriate transfer agent system 60 for execution. In a preferred embodiment, host processor 50 does not retain individual account information or position balances for any plan account. Instead host processor system 50 treats data received as an omnibus trade consisting of an aggregation of all individual trades requested at a particular record keeper for a particular 401(k) plan. Alternatively, however, individual trades and account information may be transmitted directly to host processor 50. Host processor 50 then processes the individual account transactions otherwise, in accordance with this invention.

Transfer agent system 60 receives the omnibus plan trade files from host processor 50, executes the transactions, and acts within the financial network for purposes of updating plan omnibus account, applying dividends to fund shares, and transmitting netted purchase and redemption information to the fund accountant. In addition, transfer agent system 60 provides account balance information and transmits transaction statements and a hard copy of transaction confirmations to the plan sponsor or trustee representatives.

Figure 2:
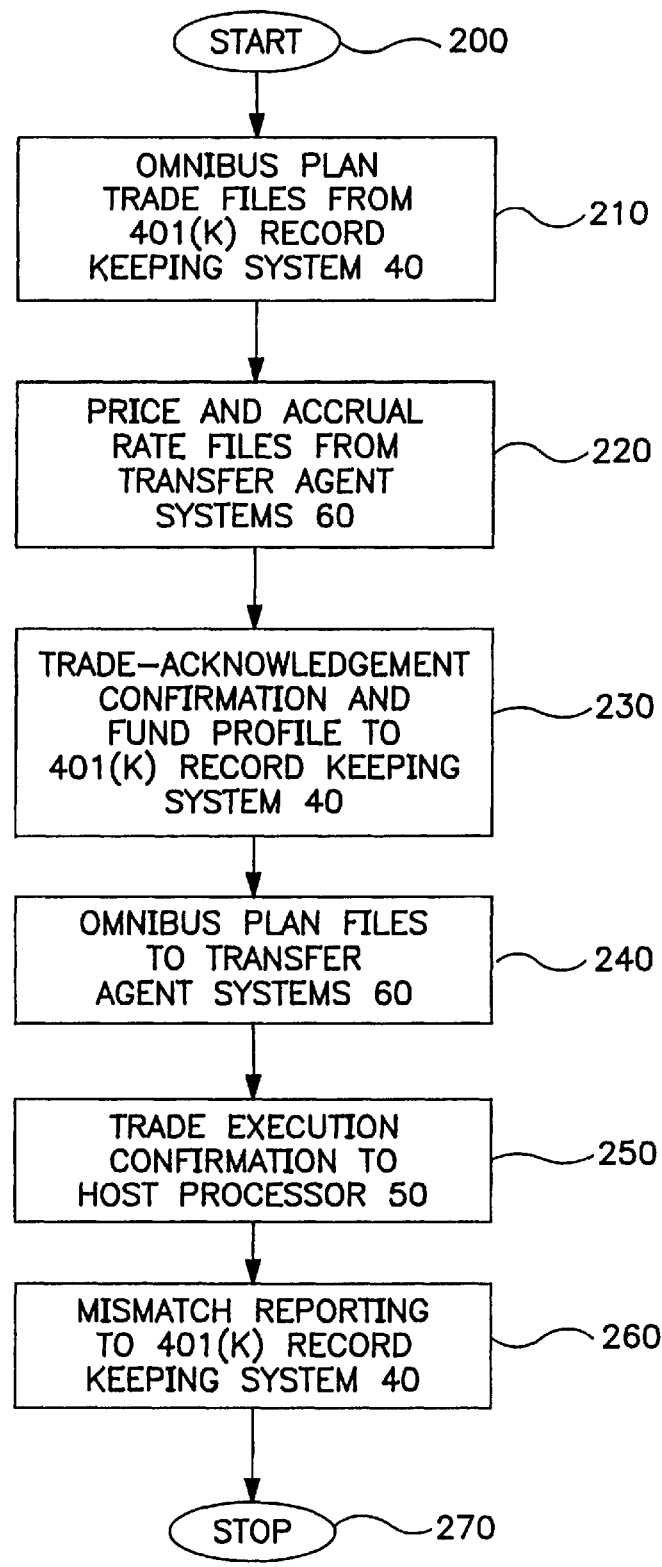
FIG. 2 is a flowchart illustrating the overall process according to the present invention.

Turning now to FIG. 2, the overall sequence of events occurring within the system of this invention is described. The overall sequence of events, as described above, is preferentially performed as a daily cycle. Thus, at the termination of the trading day, a cut-off point is established beyond which time any trades requested are processed during the next day's cycle. Trades requested by a participant or on behalf of a participant during the normal workday (e.g., through 4 P.M. Eastern Standard Time (EST)) are submitted and processed during the evening of that workday. After the end of the workday, for example, after 4 P.M. EST, 401(k) record keeping system 40 aggregates all trades requested by a plan's participants for each investment option. For example, if thirty participants wish to purchase 10 shares each of mutual fund X of transfer agent Y, then 401(k) record keeping system 40 would submit a trade request for a purchase of 300 shares of mutual fund X and direct the request to transfer agent Y.

At step 200, the process is initiated. The aggregation of all participant trades for a particular mutual fund and plan is transmitted to host processor 50 in an omnibus trade file. The transmission of the omnibus plan trade files are preferably performed by 6 P.M. EST. Thus, host processor 50 need not concern itself with a multitude of individual participant trades. Rather, host processor 50 treats the information received from 401(k) record keeping system 40 for each plan as a single, aggregate trade.

Upon receipt of the trade information, host processor 50 retains the information and waits for receipt of one or more price files from transfer agent system 60. The price files, according to a preferred method of this invention, are transmitted from transfer agent system 60 to host processor 50 at approximately 7:30 P.M. each business day. This is illustrated as step 220, in FIG. 2. The transfer may be referred to as a "price feed." Such a price feed includes a fund profile including net asset value (NAV) and daily accrual rates for each fund. The fund profile may further include dividend pay dates and additional fund-specific information.

Once host processor 50 has obtained the price feed as well as the omnibus plan trade data, it initiates processing of trades with respect to the most recent price information for the selected funds. Processing includes pricing and extending the omnibus plan transaction requests. Upon completion of this processing, the priced and extended omnibus plan trade files are transmitted to the appropriate transfer agent system 60 in the transaction processing network. In a preferred embodiment, this occurs at approximately 8:00 P.M. each evening. This is illustrated at step 240. At approximately the same time (7:30–8:30 P.M), host processor 50 trade-acknowledge confirms the omnibus plan trades to 401(k) record keeping system 40. The data transmitted to 401(k) record keeping system 40, includes confirmation of accepted and rejected trades and exchanges. Host processor 50 also transmits the fund profile file, which includes price and accrual rate information, to 401(k) record keeping system 40 (step 230).

At step 250, a file containing trade-execution confirmation records, account position information, and fund originated activity is transmitted to host processor 50 from transfer agent systems 60. In a preferred embodiment of this invention, step 250 occurs prior to 6:00 A.M. on the following day. Finally, at step 260, after receiving all trade-execution confirmation files, host processor 50 prepares and transmits three files to 401(k) record keeping system 40. These files include the Plan Account Position File, the Dividend Activity File, and the Mismatch Report File. Each of these files, their usage and their relationship to the overall system will be discussed in detail below. The files are transmitted separately and in a preferred embodiment are scheduled to be complete by 7:00 A.M.

The system of this invention, in one embodiment, primarily processes three types of transactions. These transactions are purchases, redemptions, and exchanges. Each type of transaction is now discussed. It will be apparent to one of skill in the art that additional transaction types could be processed through the teachings and within the scope and spirit of this invention. Such additional transactions may be dictated by the particulars of a benefit plan or the transactional environment to be implemented on the system of this invention.

The first transaction type to be discussed is subscriptions, or purchases. Most purchases will be received by the record keeper as payroll deductions. Payroll systems within the employer organization process deductions from participants during normal payroll processing, creating either a transmission file or a hard copy output to be forwarded to the record keeper. Any purchase adjustments may be forwarded to the record keeper directly from the participant. Each participant's purchase dollars received from the plan sponsor are processed against their investment elections and distributed between the elected investment options.

Host processor 50 preferably requires all purchase transactions to be specified in dollar amounts. This is because at the time purchases are requested, the particular share price, and thus the required dollar amount to purchase a particular share amount, is unknown.

Mutual fund purchase trades for funds supported by host processor 50 are preferably totalled by plan, and a single trade record by plan is formatted for transmission to host processor 50. The purchase transaction information reported to host processor 50 includes at least the following:

---

Control Number
CUSIP Number
Dealer Number
Transaction Type
Transaction Code
Trade Date
Settlement Date (equal to Trade Date)
Plan Account Number
Fund Account Number
Dollar/Share Amount of Trade
ROA/LOI Amount
LOI Date

---

An example of a record group containing the above information is illustrated collectively in FIGS. 3, 4, and 5, wherein the three records used in connection with a purchase transaction are designated record types 01.1, 01.2, and 01.3, respectively. The purchase records are forwarded to a preprocessor 55, where the trade is priced, extended and confirmed to 401(k) record keeping system 40. Host processor 50 then sorts and formats the trade and transmits it to transfer agent system 60. Sorting occurs at the mutual fund level. All trades in a particular mutual fund are collected and transmitted together to transfer agent system 60.

Transfer agent system 60 then prices and extends the trade and updates the appropriate plan account. As a result of this process, a purchase transaction is reflected on the plan account history, detailing trade date, purchase price and shares purchased. The total share balance increases by the purchase share amount.

Next, transfer agent system 60 forwards the trade-execution confirmation for each plan account and position information to host processor 50. Host processor 50 then strips out the individual confirmations for each plan to send to the appropriate 401(k) record keeping system 40 where that plan is kept. Finally, host processor 50 creates a mismatch print image report for transmission to 401(k) record keeping system 40.

Mismatches may be required for a variety of reasons. For example, the ROA is maintained by 401(k) record keeping system 40 and transfer agent system 60. In requesting a trade, the ROA information is transmitted in the purchase/redemption record. The ROA value is provided as part of the data transmitted to host processor 50 and eventually to transfer agent system 60. If transfer agent system 60 calculates a more favorable discount level which, in turn, changes the price of the trade, notification as to the adjustment is provided through the mismatch report. Conversely, if transfer agent system 60 calculates a higher commission than originally anticipated, an adjustment as to purchase price in that event is similarly reported.

Also, when an LOI exists on a plan account, it is the responsibility of 401(k) record keeping system 40 to provide the LOI amount with each purchase. It is the responsibility of transfer agent system 60 to maintain and track all LOI information on plan accounts. If the LOI information maintained by 401(k) record keeping system 40 and transfer agent system 60 differs, then again a mismatch is reported.

The second transaction type to be discussed is redemptions. All redemptions of mutual fund shares are received by 401(k) record keeping system 40 and are verified to ensure that all of the plan requirements for redemption have been met. Redemption transactions may be received by host processor 50 in either dollar amounts or share amounts. The redemption transaction information reported to host processor 50 includes at least the following:

>   Control Number
>   CUSIP Number
>   Dealer Number
>   Transaction Type
>   Transaction Code
>   Trade Date
>   Settlement Date (equal to Trade Date)
>   Plan Account Number
>   Fund Account Number
>   Dollar Amount/Share Amount of Trade It will be noted that the record group described above with reference to FIGS. 3, 4 and 5 for purchase transactions also serves, in a preferred embodiment, as the record group for a redemption transaction. The redemption records are forwarded to a preprocessor 55, where the trade is priced, extended and trade-acknowledge confirmed to the 401(k) record keeping system 40. Host processor 50 then formats the trade and transmits it to transfer agent system 60.

The final transaction type to be discussed is exchanges. In one embodiment, exchanges may be received by 401(k) record keeping system 40 from the plan participants or from the plan participants through a Voice Response Unit (VRU). These transactions may be processed in either dollars or in share amounts. The specific limitations on transfers such as frequency, transfer origins and destinations, etc., vary by plan and are authorized and enforced by 401(k) record keeping system 40.

Standard exchanges are processed as same day trades, with the exchange redemption and the exchange purchase both updating the appropriate plan omnibus account on transfer agent system 60 on the same date. Standard exchange trades are transmitted to host processor 50 to include at least the following information:

>   Control Number
>   From CUSIP Number
>   To CUSIP Number
>   Dealer Number
>   Trade Date
>   Plan Account Number
>   From Fund Account Number
>   To Fund Account Number
>   Dollar/Share Amount
>   401(k) Exchange Fee Exemption Indicator An example of a record group containing the above information is illustrated collectively in FIGS. 6, 7, and 8, wherein the three records used in connection with a purchase transaction are designated record types 15.1, 15.2, and 15.3, respectively. The exchange records are forwarded to host processor 50 for pre-processing where the trade is priced, extended, and trade-acknowledgment confirmed to 401(k) record keeping system 40. Host processor 50 may then format the trade as required by each transfer agent system 60 so that the trade may be further transmitted to transfer agent system 60.

Transfer agent system 60 may then price and extend the redemption side of the transaction to calculate the purchase dollar or share amount. An "exchange out" may then be processed for the plan account in the appropriate fund, thus decreasing the total share balance for that fund. An "exchange in" may next be processed for the same plan in the appropriate fund, increasing the total share balance for that fund. Both the "exchange out" and the "exchange in" transactions may be reflected in the account history, detailing trade date, price and share/dollar amount. Trades received but rejected are not processed and are trade-execution confirmed as rejected.

Transfer agent system 60 may then forward the trade-execution confirmation and plan account position information to host processor 50. Host processor 50 then creates a mismatch report for transmission to 401(k) record keeping system 40 to identify any exception items.

An additional consideration involved in exchange transactions is that of differential commissions. Differential commissions are typically assessed within the funds on exchange transactions between low front end load commission funds and high front end load commission funds. 401(k) record keeping system 40 may waive the differential commissions by forcing a high discount level. This may be accomplished by tagging the "401(k) Exchange Differential Level" field contained in the record transmitted to host processor 50 with some predetermined value. In this way exchange purchase trades may be selectively processed at NAV.

Mutual funds may also assess exchange fees each time an exchange transaction occurs. This fee is typically assessed on the redemption side of the exchange transaction. The exchange fee may also be selectively waived by placing predetermined value in the "401(k) Exchange Fee Indicator" field. This may have the effect of waiving the exchange fee on standard exchanges.

Cross-management company exchanges which involve two funds which are supported by host processor 50 but which do not belong to the same fund family may be identified by host processor 50 based upon a cross-reference of the CUSIP numbers to the management company files. An exchange with two CUSIPs which do not belong to the same management company is converted to independent purchase and redemption transactions on the system and sent to transfer agent systems 60 as such. Cross-management company exchanges, once converted to purchases and redemptions, are treated as such by transfer agent systems 60 and host processor 50. These transactions are then processed according to the normal workflows described above.

The conversion of cross-management company exchanges in this way allows host processor 50 to format individual one-sided trades for execution at different transfer agent systems 60, if required. Since different management companies may identify the same dealer with different dealer numbers, 401(k) record keeping system 40 transmits both the "from" and "to" dealer information on all cross-management company exchanges.

All dividends and capital gains for 401(k) plan omnibus accounts at the transfer agent are typically reinvested. For daily accrual fund positions, 401(k) record keeping system 40 calculates and tracks month-to-date (MTD) accrual positions at a participant level using the fund profile information provided by host processor 50. At the dividend or capital gain pay date, transfer agent system 60 may reinvest the entire dividend (through a purchase transaction) generated for a plan account as a whole back into the plan omnibus account. Following that, transfer agent system 60 transmits a dividend or capital gain reinvest record to host processor 50, to be forwarded to 401(k) record keeping system 40. 401(k) record keeping system 40 then may take the gross reinvestment and reconcile it to the participant level positions.

Dividends are set and paid on each transfer agent system 60. Host processor 50 may receive a confirmation of the dividend and forward a dividend record to 401(k) record keeping system 40 at approximately 6:00 A.M. on post date plus one. Participating systems may be supplied with a Corporate Actions Calendar which contains the record, ex, and pay dates for the non-daily accruing funds. Rates for daily accruing funds can not be included with the calendar since they are not available until pay date.

In connection which each transaction occurring within the system of this invention, a control number is generated to reference the transaction. The control number in a preferred embodiment of this invention consists of 20 alphanumeric characters which uniquely identify each transaction across all three subsystems: 401(k) record keeping system 40, host processor 50, and each of transfer agent systems 60. The control number is defined by host processor 50 in conjunction with 401(k) record keeping system 40. In a preferred embodiment the number may take the form:

| 1-2-3 | 4-5-6 | 7-8-9 | 10-11-12-13-14-15 | 16-17-18-19-20 |
| --- | --- | --- | --- | --- |

Positions 1 through 3
The first three digits uniquely identify the source system of the trade. These digits are assigned by host processor 50.
Positions 4 through 6
The second three digits are assigned by 401(k) record keeping system 40 and represent the database number within 401(k) record keeping system 40. This provides uniqueness of control numbers across databases within 401(k) record keeping system 40.
Positions 7 through 9
The next three numbers represent the Julian date, and serve to uniquely identify control numbers across days. These digits are assigned by 401(k) record keeping system 40.
Positions 10 through 15
These six digits are assigned by 401(k) record keeping system 40 and uniquely identify the trade. In one embodiment, the number of a trade is the number of the previous trade incremented by one.
Positions 16 through 20
These five positions are available to contain miscellaneous information defined by either host processor 50 or 401(k) record keeping system 40.

In addition to the control number, the system of this invention preferably incorporates a unique plan account number for each plan account contained at 401(k) record keeping system 40. This number is held at the fund on the plan account record, and is required by host processor 50 with every trade. The assignment of the plan account number is separate from the assignment of the fund account number; one plan account number may have several different fund account numbers. The plan account number is constant for all fund accounts that belong to a particular plan. The plan account number in a preferred embodiment consists of 20 alphanumeric characters on the input record layouts to host processor 50. This number is a required field for all transaction and position reporting. The plan account number serves to identify a plan account for purposes of executing trades and creating a position file and is defined by host processor 50 and 401(k) record keeping system 40. The format of the plan account number in a preferred embodiment is as follows:

| 1-2-3 | 4-5-6 | 7-8-9-10-11-12-13-14 | 15-16-17-18-19-20 |
| --- | --- | --- | --- |

Positions 1 through 3
These characters are assigned by host processor 50 and are used to identify the source system of a trade as well as the transfer agent account level for correct activity and position file processing. The plan account number is utilized by host processor 50 as the criteria to split the 401(k) activity within the confirmation file sent back from transfer agent system 60 for each 401(k) record keeping system 40.
Positions 4 through 6
These three digits are set by 401(k) record keeping system 40 and are utilized by 401(k) record keeping system 40 to store the database identifier within the system where the plan information is held.
Positions 7 through 14
The next eight digits are also assigned and utilized by 401(k) record keeping system 40 in this case to fill in the Plan Number held on 401(k) record keeping system 40.
Positions 15 through 20
These six positions are available to contain additional information such as trustee information, for example.

A fund account number is assigned by transfer agent system 60 when an account is manually set up, prior to any trading. Ideally, each plan has one mutual fund account number for each fund management company. The same account number is used across all fund options in that fund management company. However, multiple fund account numbers may exist for each plan account, even for those in the same management company. As a result, 401(k) record keeping system 40 maintains the fund account number at both a plan and fund option level.

For each trade executed through the system of this invention, 401(k) record keeping system 40 provides a fund account number. Host processor 50 does not validate fund account numbers or cross reference them to plan account numbers. Trades received by host processor 50 or by 401(k) record keeping system 40 without a fund account number are rejected.

A dealer number (executing and clearing) is used by transfer agent system 60 to identify different dealers. At times, transfer agent system 60 may utilize an industry standard dealer number, while in other cases, transfer agent system 60 may assign a number. In either case transfer agent system 60 rejects a trade if it does not locate a dealer number on a particular trade. As part of the input record layouts, the dealer number is a required non-zero field. Invalid dealers are rejected by transfer agent system 60.

Within the system of this invention, a single dealer may have multiple plan accounts that span more than one management company. For example, XYZ Securities may be dealer number 000001 on one transfer agent system but may be known as dealer number 987654 on another transfer agent system within the network. Thus, 401(k) record keeping system 40 maintains the correct dealer number for a plan.

Branch and representative numbers are assigned by the dealer. The branch is the location of the dealer office, while the representative number is the account executive assigned to the account. These numbers are required fields in the record layouts. A transaction is not, however, rejected for invalid branch and/or representative numbers.

As described above, host processor 50 receives trades from one or more 401(k) record keeping systems 40. At each 401(k) record keeping system 40, received trades are first processed against participant level records to verify that the trades, at a plan and participant level, are within required parameters. Approved purchase trades are batched by plan into a single trade record for processing by host processor 50. Other types of trades may be batched by plan or submitted individually.

The trades received at host processor 50 are first preprocessed for file integrity and data errors. Subsequently, the trade records are priced, extended, and trade-acknowledgment confirmed to 401(k) record keeping system 40. The process of producing a trade-acknowledgment confirmation record to be transmitted to 401(k) record keeping system 40 is next described with respect to FIGS. 17A–17D.

Initially, the trade-acknowledgment confirm file (to be transmitted to 401(k) record keeping system 40) and the omnibus plan trade file which has been received from 401(k) record keeping system 40 are opened (steps 1710, 1712). The system next obtains a system time and date to be used for transaction processing as later described. Next, the system reads the omnibus plan trade file (step 1714) and ensures that data exists in the file. If an end of file character is read (step 1716), host processor 50 exits (step 1718). Otherwise, it determines whether the omnibus plan trade file constitutes an aggregate of purchase trades, redemption trades, or exchange trades (step 1720). In the first two cases, three separate trade-acknowledgment confirm records are constructed while in the last case, four separate trade-acknowledgment confirm records are constructed.

If the omnibus plan trade file constitutes redemptions or purchases, then a redemption/purchase type confirm file is built (step 1722). If the trade file constitutes redemptions (as determined in step 1726), the redemption is moved into the confirm file transaction type field (step 1728). Otherwise, purchase is moved into the transaction type field (step 1730). Then trade date (step 1732), plan account number (step 1734), fund account number (step 1736), payment date (step 1738), error code (step 1740) (if reject of any kind has occurred), dollars (step 1752), shares (step 1754), commission (only on purchases) (step 1756), purchase price (step 1758), and control number (step 1760) are all moved into the confirm file. The trade-acknowledgment confirm file may then be written (step 1762) and control passed back to the calling routine (step 1786).

If the trade file contains exchanges (as determined in step 1720), then an exchange type confirm file is built (step 1724). Then, trade date (step 1744), plan account number (step 1746), to fund account number (step 1748), from fund account number (step 1750), fund and management code (step 1764), error code (if rejects have occurred) (step 1766), to dollars (step 1768), from dollars (step 1770), to shares (step 1772), from shares (step 1774), differential commission (step 1776), from price (step 1778), to price (step 1780), and control number (step 1782) are all moved into the exchange confirm file. The exchange type trade-acknowledgment confirm file may then be written (step 1784) before control passes to the calling subroutine (step 1786).

FIGS. 9, 10 and 11 illustrate, in one embodiment, the structure of the purchase/redemption type confirm records. FIGS. 12, 13, 14 and 15 illustrate, in one embodiment, the structure of the exchange type confirm records.

The trade-acknowledgment confirm file build process is completed by storing the number of trade records read as well as the number of trade-acknowledgment confirm files created. Finally, all files are closed and the trade-acknowledgment confirm files are transmitted to 401(k) record keeping system 40 for each particular plan. As described above, the transmission of the trade-acknowledgment confirm files, in one embodiment, is accomplished on a daily cycle at or about 8:00 P.M. every evening.

In general, 401(k) record keeping system 40 assumes that the settlement date is the same as the trade date. If transfer agent system 60 determines otherwise, it notifies host processor 50 of the actual settlement date. Host processor 50 then includes this information in the trade-acknowledgment confirm file to be sent to 401(k) record keeping system 40. On or after the settlement date, the trade-execution confirm is sent by transfer agent system 60 to host processor 50 which passes it on to 401(k) record keeping system 40. If host processor 50 is notified any time before the settlement date that the trade did not complete, then host processor 50 notifies 401(k) record keeping system 40 of the failure immediately rather than waiting until after the settlement date to do so.

For example, if the trade date was Sep. 12, 1994, for example and the particular transfer agent system 60 does not settle the trade until two days after the trade date, or on Sep. 14, 1994, for example. Then, in this embodiment, the trade-acknowledgment confirmation from host processor 50 is sent on Sep. 12, 1994 with an indication that the settlement date is Sep. 14, 1994. Trade-execution confirmation then is sent on or after Sep. 14, 1994. If on September 12 or 13, however, the trade is rejected, host processor 50 notifies 401(k) record keeping system 40 immediately rather than waiting until September 14 or later to do so.

In addition to the trade-acknowledgment confirm file which is transmitted to 401(k) record keeping system 40 at approximately 7:30 to 8:30 PM daily, a fund profile is also generated and transmitted. After the prices and other information from transfer agent system 60 have been entered into transfer agent system 60 and transmitted to host processor 50, host processor 50 strips off the fund profiles for the funds and transmits a record to 401(k) record keeping system 40. This file is used to supply fund level NAV price and accrual rate information to 401(k) record keeping system 40 in order to support reconciliation and other processing requirements within 401(k) record keeping system 40 itself.

In creating the fund profile, initially a group of files are received from each transfer agent system 60 which may include funds which are participating in the automated trade processing system as well as funds that are not participating. These files include a fund management company file, fund files, a date file, and a price file. The fund management company file includes data regarding each particular fund family and the characteristics of the fund management company sponsoring that fund family. The fund file contains data such as name of fund, 12b1 eligibility, load information, daily NAV, and dividend and capital gain information. Finally, the price file contains historic price information for each of the funds.

Host processor 50 examines each fund to determine if it is a participating fund. If the fund is participating, the fund record and price record for that fund is retrieved. Further, each participating fund is examined to determine if it is active. Inactive funds are not forwarded to 401(k) record keeping system 40. Each fund is also examined to determine if a price is available for the fund. If not, processing terminates abnormally and an operator is signalled to retrieve the necessary price information directly from the fund management company for each of the funds for which price information is missing. If such information is available, the operator may place the required price information into the online system. Processing then may be re-initiated with the correct pricing information.

Once all records corresponding to system eligible funds are retrieved, they are re-formatted to match system formats so that they may be processed to form the final fund profile to be transmitted to 401(k) record keeping system 40. All of the data contained in the retrieved records is edited according to the requirements of each 401(k) record keeping system 40 to provide summary information on each of the system eligible funds. This fund profile file is transmitted to 401(k) record keeping system 40 at or about the same time as the trade-acknowledgment confirm file described above.

After execution of the omnibus plan trades, transfer agent systems 60 transmit a trade-execution confirmation file to host processor 50. This file contains trade-execution confirmations and rejects for activity processed by transfer agent system 60. Host processor 50 uses the trade-execution confirmation file in processing a mismatch report, using control number and plan account number as the initial match criteria. The system of this invention preferably includes the ability to pre-process trade-execution confirm files received from a variety of transfer agent systems 60 in a variety of formats. The trade-execution confirm files received from the transfer agents are processed so as to conform with the format of the trade-acknowledgment confirm file generated by host processor 50. In this way, comparison between the two confirm files, as discussed below, is facilitated.

Activity that is rejected or processed differently than previously trade-acknowledgment confirmed to 401(k) record keeping system 40 appears on a mismatch report generated by host processor 50. The mismatch report may then be provided electronically to 401(k) record keeping system 40 for automatic updates. Alternatively, this report is a hard copy report which may be used to manually adjust account information at 401(k) record keeping system 40. Host processor 50 forwards trade-execution confirm report for all 401(k) originated activity that appears on the mismatch report.

In addition to 401(k) record keeping system 40 originated activity, tranfer agent system 60 provides fund originated activity (e.g., dividends, capital gains) to host processor 50 in the trade-execution confirmation. Fund originated activity appears on the mismatch report forwarded to 401(k) record keeping system 40. 401(k) record keeping system 40 does not receive a trade-execution confirmation from transfer agent system 60 (through host processor 50) for any activity correctly trade-acknowledge confirmed by host processor 50.

Figure 16:
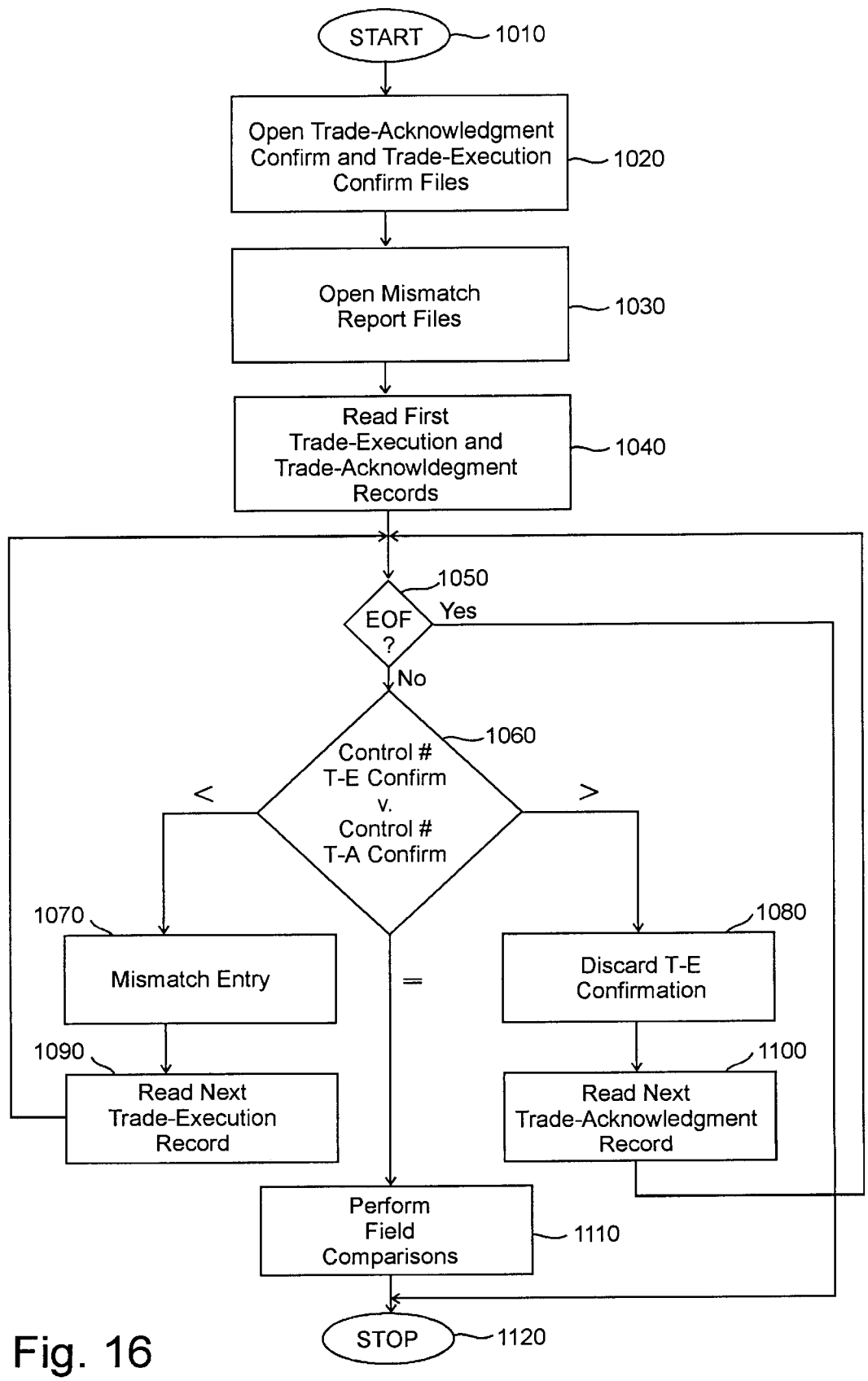
FIG. 16 is a flow chart depicting a process for creating a mismatch report according to one embodiment of the present invention.
Figure 17A:
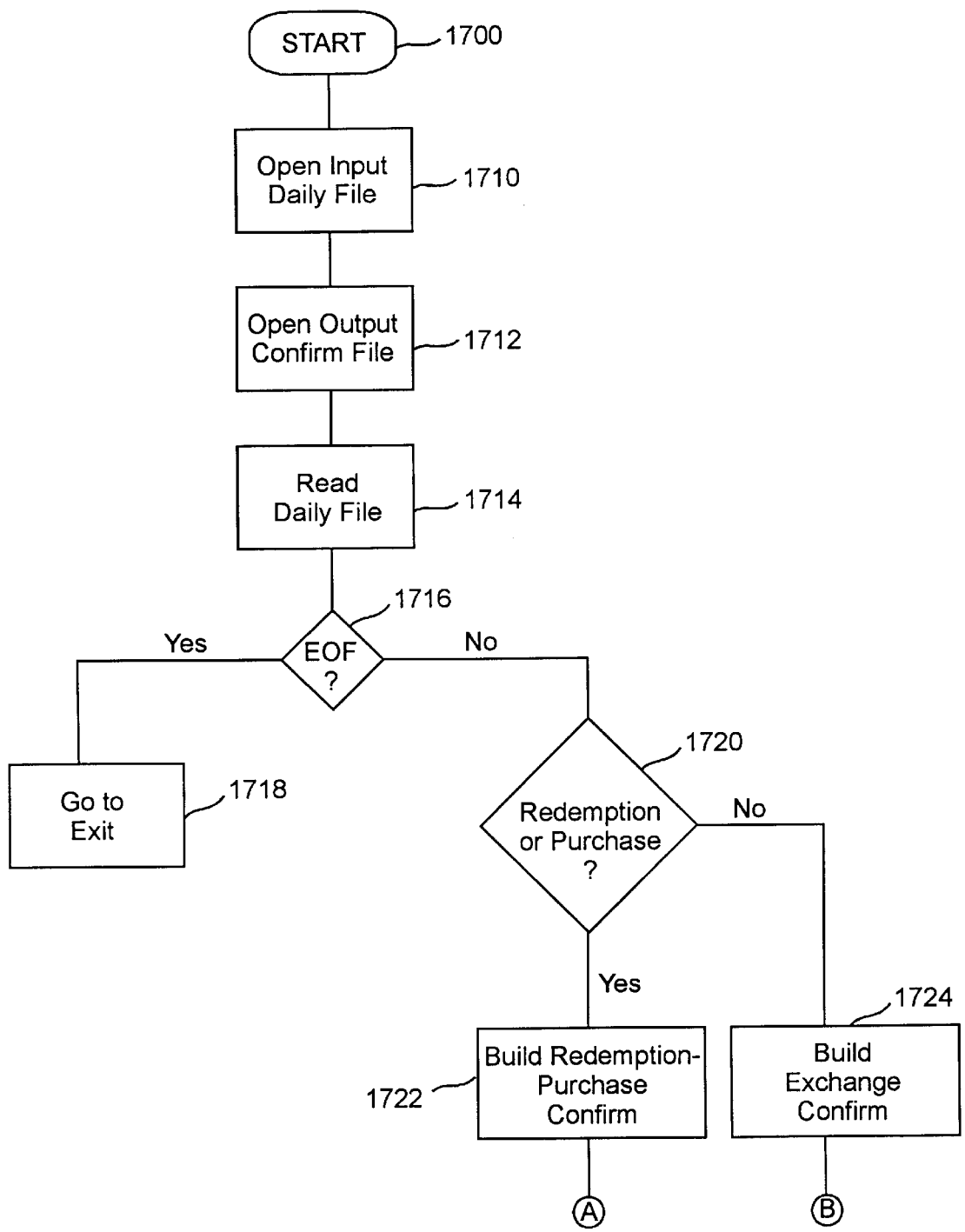
FIGS. 17a–17d are flow charts depicting the daily confirmation build process according to one embodiment of the present invention.
Figure 17B:
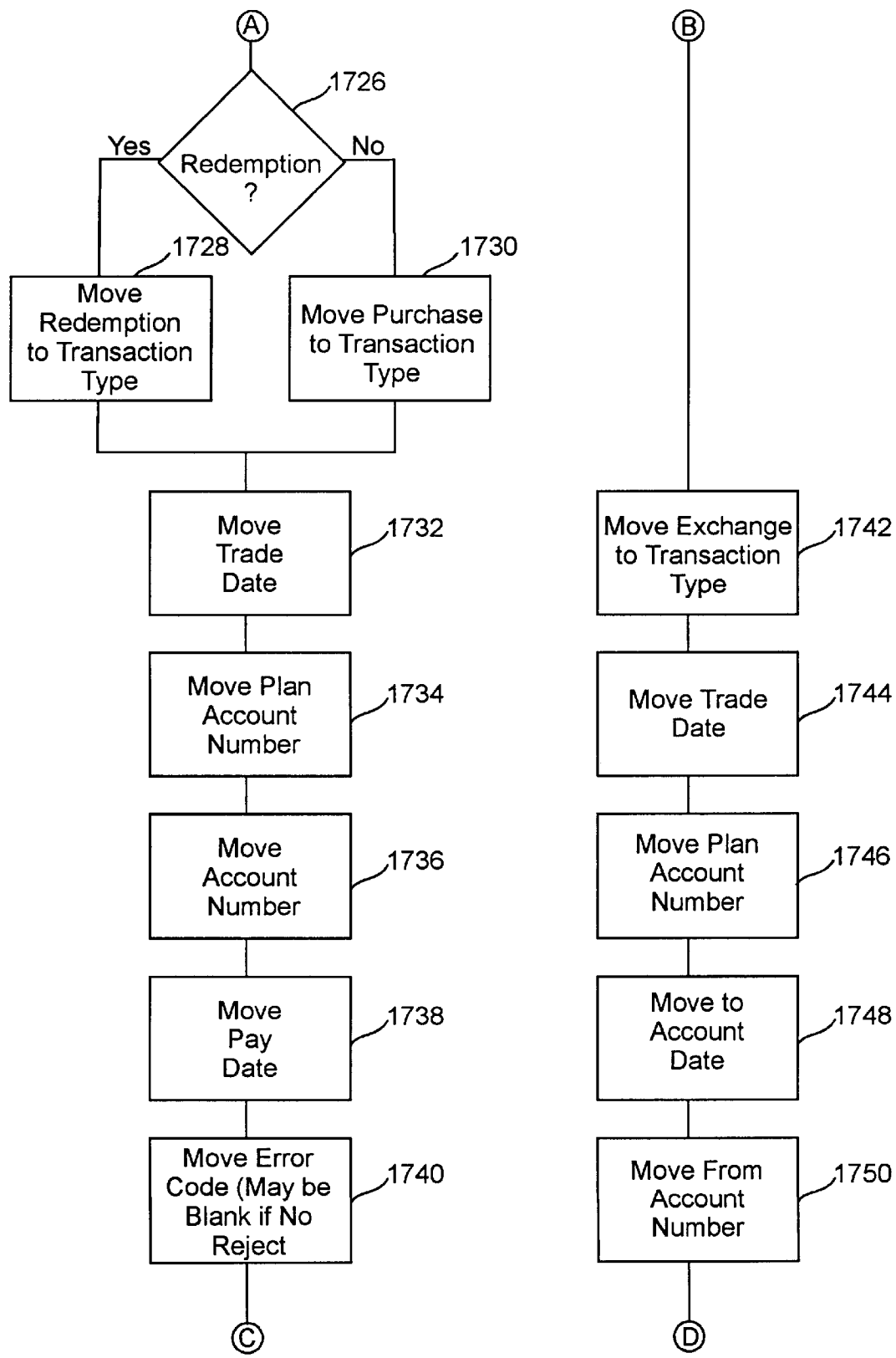
Figure 17C:
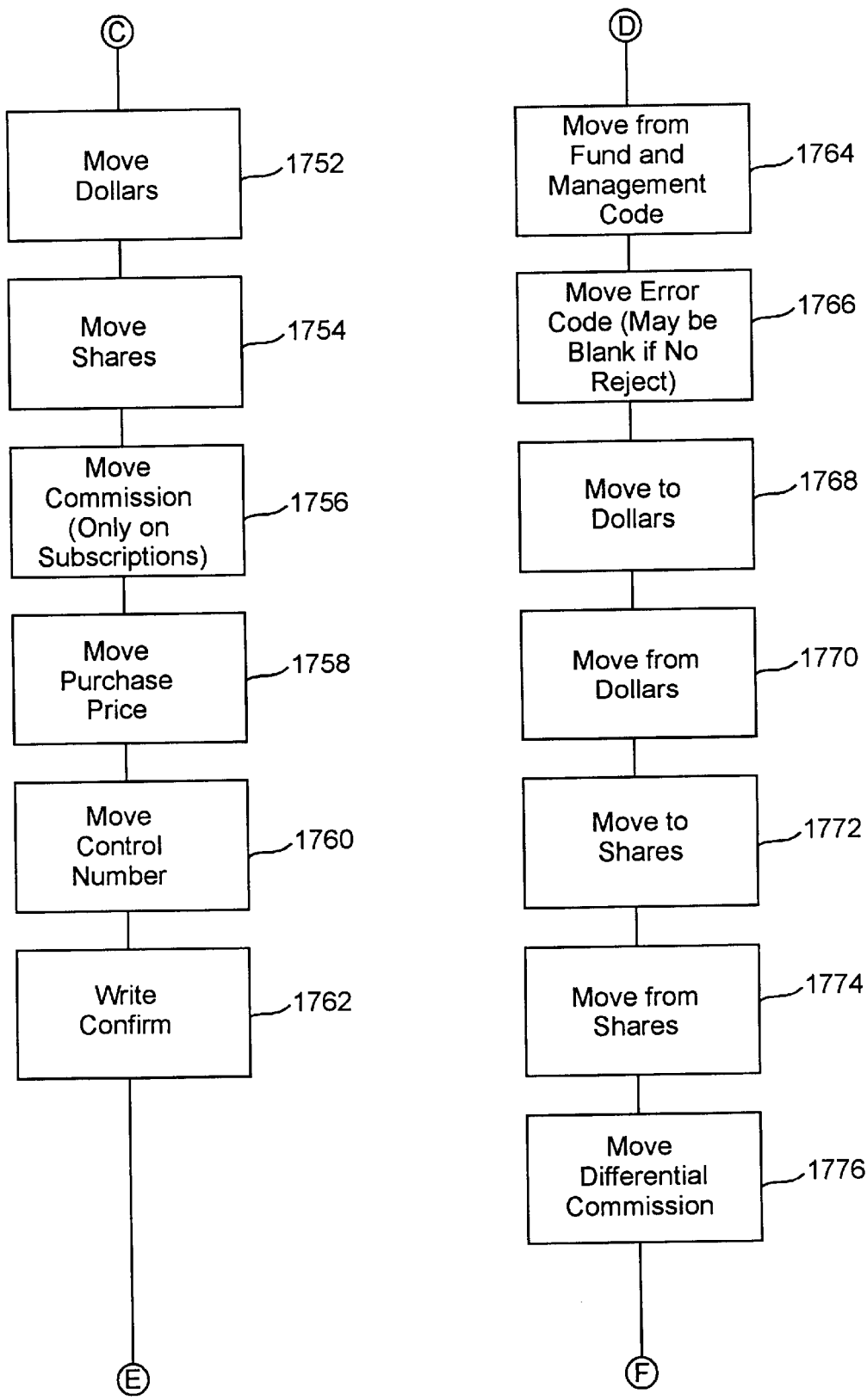
Figure 17D:
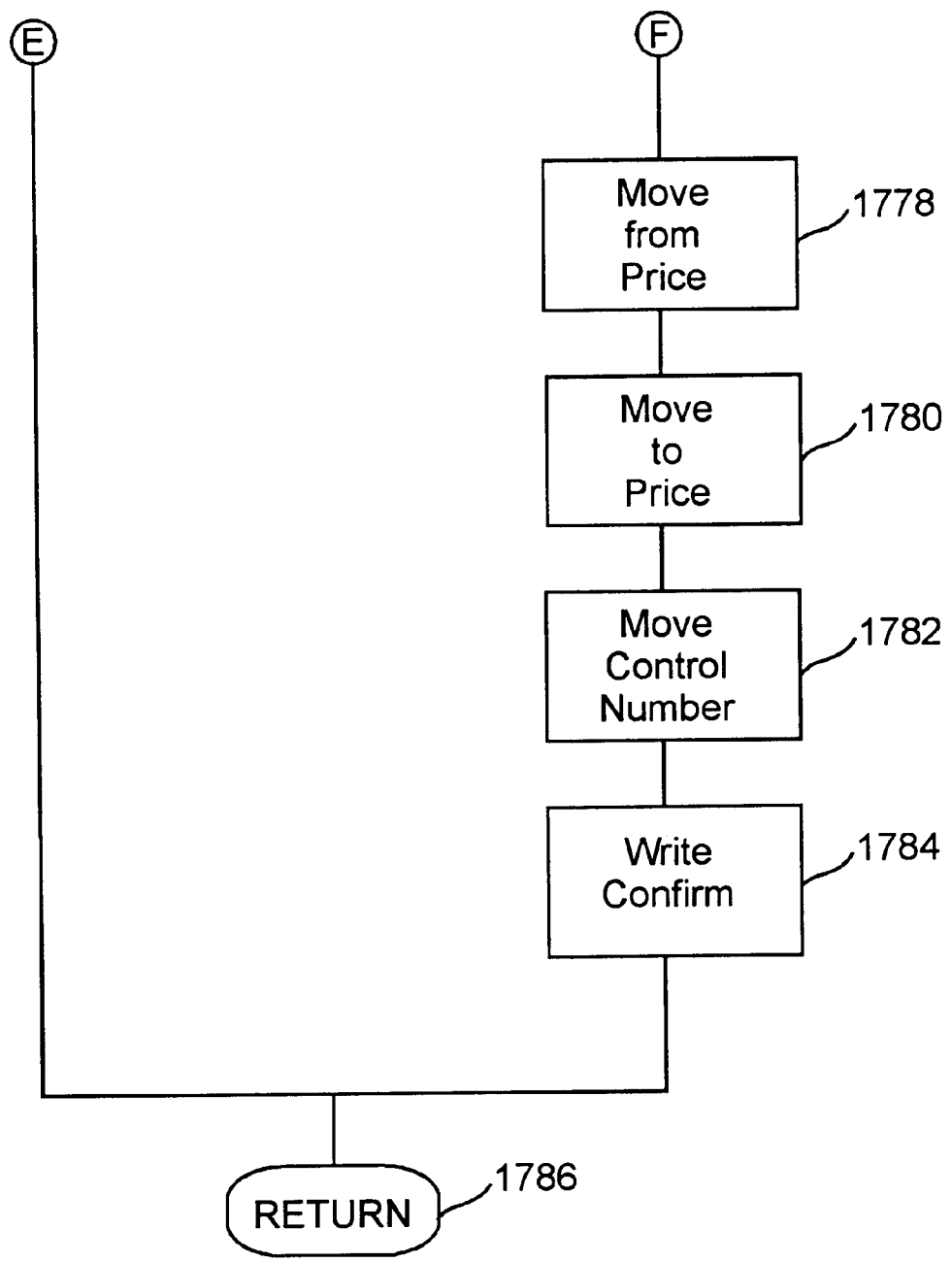

FIG. 16 illustrates the process, according to a preferred embodiment of this invention, for creating the mismatch report. The process is initiated at step 1010. Host processor 50 performs this procedure once daily on a trade-execution confirm file that has been sorted to separate exchange, purchase, and redemption transactions. Host processor 50, at step 1020 first opens the trade-acknowledgment confirm file previously sent to 401(k) record keeping system 40 as well as the trade-execution confirm file received from transfer agent system 60. These two confirm files are opened for reading and a mismatch report file is opened, at step 1030, for writing. A single record from the trade-execution confirm file is read at step 1040 and it is compared with the first record in the trade-acknowledgment confirm file (which is also read at step 1040) based upon the broker client number as well as the control number discussed above. These numbers together provide a unique identifier for each trade made during that day's cycle of trades. Assuming that neither file has reached the end of file at step 1050, the process continues. If either file is empty, the process immediately halts at step 1120 and no mismatch file is transmitted. In this case a position file only is transmitted to 401(k) record keeping system 40 the next morning.

Three possibilities exist with respect to the comparison of broker client number and control numbers for the records in the trade-execution confirm and trade-acknowledgment confirm files. This comparison is illustrated as step 1060 in FIG. 16. In one case they may match. In a second case, the control number for the trade-execution confirm record may be numerically smaller than that of the trade-acknowledgment confirm record and in a third case the trade-acknowledgment confirm record may be numerically smaller than that of the trade-execution confirm record.

If the records match, control transfers to step 1110 and a comparison as described below is immediately undertaken between the two records that represent the same trade. Otherwise, if the trade-execution confirm record is smaller than that of the trade-acknowledgment confirm record, it indicates that a transfer agent/mutual fund generated trade was processed and control is passed to step 1070. For example, a trade may have been manually entered at transfer agent system 60 through the online system. Thus, the trade was not reflected in the trade data initially transmitted from 401(k) record keeping system 40 to host processor 50. As a result, the trade was never trade-acknowledgment confirmed previously from host processor 50 to 401(k) record keeping system 40. In this case, a full mismatch entry reflecting the trade initiated at transfer agent system 60 is included on the mismatch report. This is shown at step 1070.

Once the mismatch entry is generated, the next sequential record from the trade-execution confirm file is read at step 1090 and, assuming the end of file has not been reached (as checked at step 1050) it is compared with the same trade-acknowledgment confirm file record. Again, a comparison is performed on the control number and plan account number at step 1060 and the process is repeated.

Alternatively, if the control number comparison results in a control number for a trade-execution confirm file record being greater than that of a corresponding trade-acknowledgment confirm file record then a host processor reject is indicated. In other words, the trade represented by the current trade-acknowledgment confirm file record was rejected by host processor 50. In this case control transfers to step 1080. As described above, in this case, the trade was previously trade-acknowledge confirmed back to 401(k) record keeping system 40, as rejected. Since it is undesirable to reconfirm the rejection through the mismatch report, the rejected trade is not included on the mismatch report. The next trade-acknowledgment confirm file record is retrieved at step 1100 and assuming end of file has not been reached it is compared with the existing trade-execution confirm file record. At this stage the process is repeated.

Once two control numbers have been found to match, a comparison of fields contained in each record is performed as shown in step 1110 in order to determine mismatches for the data in the record. In the case of a purchase transaction, the number of shares purchased, the purchase price, the gross dollars for the purchase, and the net dollars for the purchase are compared. If, for example, the purchase price had been incorrectly transmitted during the price feed to host processor 50, each of the number of shares, purchase price, gross and net dollar fields may not match. Similarly, if 401(k) record keeping system 40 specified an ROA level that was not, in fact, justified, the actual share purchase price may vary from that specified in the initial confirmation to 401(k) record keeping system 40. In either of these cases or in the event of any other mismatch in record fields, a summary report is included on the mismatch report describing the inconsistency between each of the fields.

If the records being compared reflect exchange transactions, the above processing is performed twice—once for the "exchange out" (redemption of shares) and once for the "exchange in" (purchase of shares in the new fund). Otherwise, processing follows a similar flow as that described in FIG. 16 in order to generate the mismatch information that may have occurred relative to either the "exchange out" or the "exchange in".

Each trading night, after the nightly processing has completed, transfer agent system 60 strips off the share positions and MTD (month to date) accrual for each plan omnibus account and forwards a position record for each plan fund account to host processor 50. Host processor 50 then forwards this information to 401(k) record keeping system 40 to be reconciled by 401(k) record keeping system 40 daily to the participant level records. Reconciliation is accomplished by summing the individual share balances and calculated MTD accrual of the participants and comparing these figures with the position at transfer agent system 60. Any discrepancies may be reconciled according to predetermined operational procedures.

A computer listing, which when operating on a computer provides a preferred embodiment of the present invention, is contained in the Microfiche Appendix which is contained in this application.

Having described the preferred embodiments of this invention, it will be appreciated by those skilled in the art that there exist numerous alternatives and equivalents which do not depart from the scope or spirit of the invention. Accordingly, it is intended that the scope of the present invention be limited only by the appended claims and not by the above description of the above preferred embodiments.

We claim:

1. An automated trade processing system, comprising:
   record keeper means for receiving participant mutual fund transaction requests for aggregating said participant mutual fund transaction requests by mutual fund into omnibus plan trade files, and transmitting said omnibus plan trade files;
   host processor means, interacting with said record keeper means, for processing omnibus plan trades from said omnibus plan trade files and trade-acknowledgment confirming said omnibus plan trades to said record keeper means;
   transaction execution means, interacting with said host processor means, for executing said omnibus plan trades, wherein trade-acknowledgment confirmation occurs at a time prior to execution of said omnibus plan trades by said transaction execution means
   wherein said transaction execution means trade-execution confirm the execution of said omnibus plan trades to the host processor means; and
   wherein said host processor means further comprises means for generating a mismatch file.

2. The automated trade processing system of claim 1 wherein said record keeper means includes means for maintaining and updating account information for each of a plurality of participants, said account information being reflective of said participant mutual fund transaction requests.

3. The automated trade processing system of claim 1 wherein said transaction execution means transmits a price feed to said host processor means prior to the time that said host processor means trade-acknowledgment confirms said omnibus plan trades to said record keeper means.

4. The automated trade processing system of claim 1 wherein said host processor means further formats said omnibus plan trade files according to requirements of said transaction execution means.

5. The automated trade processing system of claim 1 wherein said participant mutual fund transaction requests comprise redemptions, purchases, and exchanges in mutual funds.

6. The automated trade processing system of claim 1 wherein said host processor means is programmed to price and extend said omnibus plan trades.

7. The automated trade processing system of claim 1 wherein said record keeper means is a 401(k) record keeping system and said participant mutual fund transaction requests comprise transaction requests in a 401(k) plan.

8. The automated trade processing system of claim 1 wherein said host processor means transmits said mismatch file to said record keeper means.

9. A method for automatically processing participant mutual fund transactions, comprising the steps of:
   receiving participant mutual fund trade data at a record keeping system;
   aggregating said participant mutual fund trade data into a plurality of omnibus plan trade files by mutual fund;
   transmitting said omnibus plan trade files from the record keeping system to a host processor;
   transmitting price feed data regarding mutual funds from at least one transfer agent system to the host processor;
   processing omnibus plan trades from said omnibus plan trade files and said price feed data at the host processor;
   transmitting said omnibus plan trade files to an appropriate transfer agent system for execution;
   trade-acknowledgment confirming the processing of said omnibus plan trade files and said price feed data to the record keeping system prior to execution of said omnibus plan trade files at the transfer agent systems;
   executing trades contained in said omnibus plan trade files at the at least one transfer agent system;
   trade-execution confirming the execution of said omnibus plan trades to the host processor;
   transmitting said trade-execution confirming to the record keeping system;

generating a mismatch file representing differences between said trade-execution confirming and said trade-acknowledgment confirming; and transmitting said mismatch file to said record keeping system.

10. The method of claim 9 wherein said mismatch file is generated by the host processor.

11. The method of claim 9 wherein said omnibus plan trade files comprise information regarding a trade date and a settlement date, wherein said trade date differs from said settlement date, further comprising the step of:

notifying said record keeping system that said settlement date differs from said trade date by way of a confirm file.

12. The method of claim 11 further comprising the step of:

transmitting a trade-execution confirmation at a time on or after said settlement date.

13. A network for facilitating automatic processing of multiple participant mutual fund accounts and transactions relating thereto, comprising:

at least one record keeping system for storing information regarding a plurality of participants having a mutual fund account, receiving mutual fund transactions regarding said participant mutual fund accounts, aggregating said mutual fund transactions by fund and type into omnibus plan trades, and transmitting said omnibus plan trades;

a host processor interconnected with each of said record keeping systems for receiving and processing said omnibus plan trades;

at least one transfer agent system for sending trade information to said host processor, wherein said host processor uses said trade information to evaluate said omnibus plan trades and create and transmit a trade-acknowledgment confirmation file to said at least one record keeping system representing the evaluation of said omnibus plan trades prior to execution of the omnibus plan trades by the transfer agent systems;

means for trade-execution confirming the execution of said omnibus plan trades to the host processor;

means for transmitting said trade-execution confirming to the record keeping system;

means for generating a mismatch file representing differences between said trade-execution confirming and the trade-acknowledgment confirmation; and transmitting said mismatch file to said record keeping system.

* * * * *